United States Patent [19]

Ihara et al.

[11] Patent Number: 4,888,320

[45] Date of Patent: Dec. 19, 1989

[54] CATALYST AND METHOD OF MAKING THE CATALYST

[75] Inventors: Kazunori Ihara, Iwakuni; Hiromi Ohishi; Shoko Yatagai, both of Hiroshima, all of Japan

[73] Assignee: Mazda Motor Corporation, Hiroshima, Japan

[21] Appl. No.: 226,733

[22] Filed: Aug. 1, 1988

[30] Foreign Application Priority Data

Jul. 31, 1987 [JP] Japan ................. 62-193519

[51] Int. Cl.$^4$ ................. B01J 21/04; B01J 23/40; B01J 32/00; B01J 35/04

[52] U.S. Cl. ................. 502/304; 502/334; 502/434; 502/527

[58] Field of Search ............... 502/334, 439, 527, 304

[56] References Cited

U.S. PATENT DOCUMENTS 4,602,001 7/1986 Cyron ................. 502/527 X
4,719,680 1/1988 Cyron ................. 502/527 X

FOREIGN PATENT DOCUMENTS 58-23138 5/1983 Japan .
1492929 11/1977 United Kingdom .

*Primary Examiner*—W. J. Shine
*Attorney, Agent, or Firm*—Fleit, Jacobson, Cohn, Price, Holman & Stern

[57] ABSTRACT

A method of making a catalyst for cleaning exhaust gas from an engine including steps of preparing corrugated metallic panels and plane metallic panels, laminating the plane metallic panels with the corrugated metallic panels alternatively side by side to form a honeycomb structure of a metallic carrier, forming at least two layers of a base coat portion and an over coat portion of alumina based coating on the metallic carrier sequentially, and impregnating catalytic components into at least the outermost layer of the alumina based coating.

10 Claims, 4 Drawing Sheets

CATALYST AND METHOD OF MAKING THE CATALYST

BACKGROUND OF THE INVENTION

1. Field of the Invention

The present invention relates to a method of making catalyst, more particularly to a method of making catalyst for cleaning an exhaust gas from an engine.

2. Description of the Prior Art

There has been known a metallic catalyst for cleaning an exhaust gas from an engine wherein catalytic components are impregnated into an alumina coating formed on a metallic carrier. Japanese Patent Publication No. 58-23138 published on May 13, 1983 for opposition, discloses such metallic catalyst. According to the disclosure of the Japanese Patent Publication, as shown in FIG. 6, a corrugated metallic panel 1 is laminated with plane metallic panels 2 at opposite sides to form a honeycomb structure of metallic carrier. Then, on the metallic carrier is formed an alumina coating comprised of γ-alumina and the like. Catalytic components such as platinum, rhodium and the like are impregnated into the alumina coating.

In making such metallic catalyst structure, generally, after forming the aluminum coating on the metallic carrier, the carrier is dipped into an alumina slurry to deposit the alumina on a surface thereof. The carrier is calcined to form an alumina coating 30. Thereafter, the resultant coated carrier is dipped into an aqueous solution including the catalytic components to impregnate the components into the coated carrier. With this method of making catalyst structure, in depositing the alumina coating, a viscosity of the alumina slurry is high enough to deposit through a single step a proper quantity of the alumina into which a desirable quantity of catalytic components can be impregnated. In other words, in this method, a single layer of the alumina coating 30 is formed on the metallic carrier.

It should however be noted that in the case where the alumina coating is formed by a single step of depositing, a thickness of the coating is not uniform across the whole coating. Generally, the thickness of the coating tends to be relatively thick in corner portions A of the carrier structure in FIG. 6 while relatively thin in intermediate portions thereof. This means that even if the desirable quantity of alumina is deposited on the carrier as a whole, the quantity of the alumina may not be sufficient in the intermediate portions of the carrier. It will be understood that a density of the catalytic components is high in the intermediate portions of the carrier relative to the corner portions thereof after impregnation. This partly high density of the catalytic components in the carrier causes a sintering wherein separated elements of the catalytic components are fused to get together in high temperature so that the surface area of the catalyst is reduced resulting in a deterioration of the catalytic activity.

SUMMARY OF THE INVENTION

It is therefore an object of the invention to provide a method of making a metallic catalyst of a high catalytic activity.

It is another object of the invention to provide a method of making a catalyst in which catalytic components are uniformly distributed in an alumina based coating formed on a carrier.

It is further object of the invention to provide a method of making a catalyst in which a sintering of the catalytic components can be effectively prevented.

It is still further object of the invention to provide a catalyst having a high catalytic activity for cleaning the exhaust gas from the engine.

According to the present invention, there is provided a method of making a catalyst for cleaning exhaust gas from an engine including steps of preparing corrugated metallic panels and plane metallic panels, laminating the plane metallic panels with the corrugated metallic panels alternatively side by side to form a honeycomb structure of a metallic carrier, forming at least two layers of a base coat portion and an over coat portion of alumina based coating on the metallic carrier sequentially, and impregnating catalytic components into at least the outermost layer of the alumina based coating.

In forming a plurality of layers of the alumina based coating, firstly the metallic carrier is dipped into an alumina slurry including γ-alumina, boehmite, nitric acid and water then dried and calcined to form a basic coat portion of the layers of alumina based coating.

In next step, the metallic carrier formed with the basic coat portion is dipped into an alumina slurry including γ-alumina, boehmite, $CeO_2$, nitric acid and water then dried and calcined to form an over coat portion of the layers of the alumina based coating.

This operation for forming the over coat portion of the layers can be repeated for another layer of the alumina based coating if necessary.

After forming the plural layers of the alumina based coating, the metallic carrier is dipped into an aqueous solution including platinum chloride and rhodium chloride to impregnate the catalytic component into the alumina based coating.

The base coat portion of the alumina based coating is preferably 7-10 wt. % of the carrier. $NaBH_4$ is preferably impregnated into the base coat portion. The over coat portion of the alumina based coating is preferably less than 30 wt. % of the carrier.

The resultant catalyst comprises a metallic carrier in which corrugated metallic panels is laminated with plane metallic panels alternatively, first coat portion of alumina based coating formed on the metallic carrier, second coat portion of alumina based coating formed on the first coat portion, and catalytic component impregnated in at least in the second coat portion.

According to features of the present invention, the alumina coating can be formed uniformly on the metallic carrier so that the distribution of the catalytic component is homogenized across the alumina coating, specifically in the outermost layer thereof.

This means that the catalytic activity can be highly maintained.

The above and other objects and features of the present invention will be apparent from the following description by taking reference with accompanying drawings employed for a preferred embodiment of the present invention.

DESCRIPTION OF PREFERRED EMBODIMENTS

Figure 1:
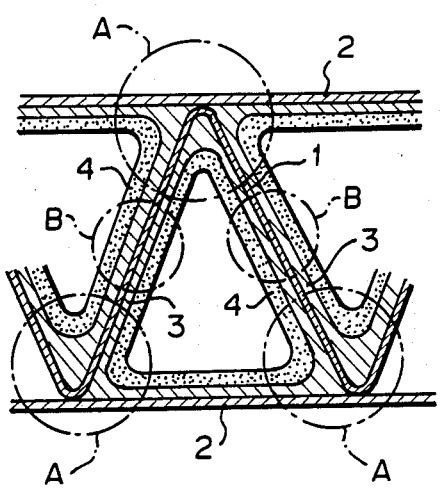
FIG. 1 is an enlarged sectional view of a catalyst in accordance with the preferred embodiment of the present invention.

Referring to FIG. 1, there is shown an enlarged sectional view of a structure of a catalyst made by a method in accordance with the present invention.

In FIG. 1, a corrugated metallic panel 1 and plane metallic panel 2 are alternatively laminated with each other in a manner that the plane metallic panels 2 are connected with the corrugated metallic panel 1 at the opposite sides thereof to form a honeycomb structure of the carrier. On the surface of the carrier structure, an alumina based coating comprising a base coat portion 3 and an over coat portion 4 are formed. Catalytic components including platinum, rhodium and the like are impregnated into the alumina based coating, mainly into the over coat portion 4 thereof.

EXAMPLE 1

Firstly, the metallic carrier is assembled by the corrugated panel 1 and the plain panel 2. Then, the base coat portion is formed thereon. Before forming the base coat portion, the carrier is calcined at 1000° C. for 6 hours in air and cooled.

In preparing an alumina slurry, 100 g of γ-alumina, 100 g of boehmite, 250 ml of water and 1.2 ml of nitric acid are intermingled to form an alumina slurry. The metallic carrier is dipped into the slurry so as to deposit the slurry on the surface of the carrier. Thereafter, the carrier is exposed to an air blow under a high pressure to remove a surplus deposition of the slurry from the surface. Then, the carrier with the slurry deposition is dried at 150° C. for 30 minutes. Thereafter, the carrier is calcined at 550° C. for 1.5 hours to fix the deposition onto the carrier surface to for a first layer of the alumina based coating or base coat portion.

Next, the over coat portion is formed on the base coat portion.

In this step, 80 g of γ-alumina, 20 g of $CeO_2$, 100 g of boehmite, 240 ml of water and 1.6 ml of nitric acid are intermingled to form an alumina slurry. The carrier on which the base coat portion is fixed is dipped into the slurry so as to deposit the slurry on the base coat portion. After an air blow, the carrier is dried at 150° C. for 30 minutes and calcined at 550° C. for 1.5 hours so the a second layer of the alumina based coating or the over coat portion is fixed on the base coat portion. Before forming the over coat portion, a reducing agent such as sodium borohydride ($NaBH_4$) is impregnated in the base coat portion so as to restrain the catalytic from impregnating into the base coat portion.

Next, the catalytic components are impregnated into the alumina based coating of the carrier.

In this step, the carrier with the base and over coat portions 3 and 4 is dipped into a solution including a predetermined quantity of platinum chloride and rhodium chloride. Then the carrier is dried at 150° C. for 30 minutes and calcined at 500° C. for 2 hours to impregnate the catalytic components into the aluminum based coating, mainly into the over coat portion of the layers. The depth of the impregnation of the catalytic components can be controlled by adjusting the concentration of the solution including the catalytic components.

The resultant catalyst obtained through the above steps is provided with the base coat portion 3 of 7 wt. % of the carrier, the over coat portion 4 of 14 wt. % of the sum of the carrier and the base coat portion 3, $CeO_2$ of 10 wt. % of the over coat portion, platinum concentration of 1.33 g/l and rhodium concentration of 0.27 g/l.

According to the above method, a viscosity of the alumina slurry is kept at a relatively low value so that a relatively thin film of the slurry for the base coat portion 3 is deposited on the carrier surface. It will however be understood that the slurry rounds out the corner portion A of the carrier in some extent. This facilitates that a homogeneous thickness of the over coat portion 4 is formed o the base coat portion 3. Since the catalytic components are mainly impregnated into the over coat portion 4 of the alumina based coating, a homogeneous distribution of the catalytic components on the carrier can be obtained.

Performance Test

The resultant catalyst obtained through the above method is compared with a catalyst obtained through a conventional method in performance.

Figure 2:
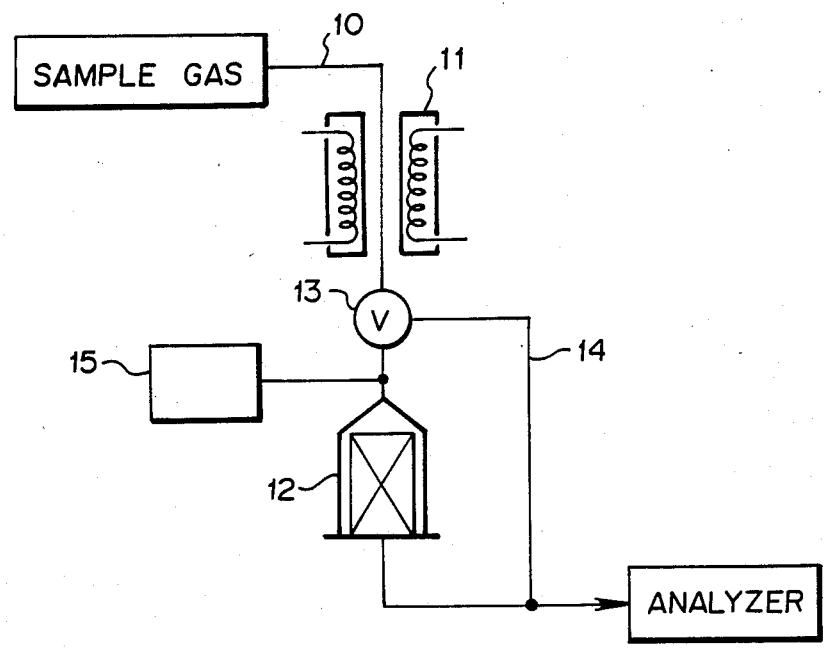
FIG. 2 is a schematic view of a test device for examining a performance of catalyst.

This test was carried out by employing a test device as shown in FIG. 2.

This test device is provided with a gas passage 10, an electric oven 11 heated at a temperature of 650° C. and catalyst device 12 in which a catalyst is placed, a switching valve 13, a bypass passage 14 and a thermometer 15 provided at an entrance of the catalytic device. The switching valve 13 is adapted to switch a route of a sample gas between the catalyst device 12 and the bypass passage 14. The sample gas is introduce into the electric oven 11 and into the bypass passage 14 when the test is not in operation.

In test operation, the valve 13 switches the route of the sample gas to the catalyst device from the bypass 14. The sample gas is introduced into the catalyst device 12 while detecting the temperature of the gas. Then the gas is introduced into an analyzer in which components of the gas are analyzed.

A flow rate of the sample gas is 24 l/min. An air fuel ratio for producing the sample gas is 14.5. After heating catalysts for testing at 900° C. for 50 hours as an aging condition thereof, the catalysts are employed for the test.

The conventional catalyst is prepared as follows.

The same structure of a carrier as the present invention is prepared. The carrier is calcined at 1000° C. for 6 hours. In preparing an alumina slurry, 80 g of γ-alumina, 20 g of $CeO_2$, 100 g of boehmite, 240 ml of water, 1.6 ml of nitric acid are intermingled. The metallic carrier is dipped into the alumina slurry. After an air blow, the carrier with a film of alumina slurry is dried at 150° C. for 30 minutes and calcined at 550° C. for 1.5 hours. Thereafter, the resultant carrier is dipped into a solution including a predetermined quantity of platinum chloride and rhodium chloride. Then the carrier is dried at 150° C. for 30 minutes and calcined at 500° C. for 2 hours to get a catalyst.

The catalyst contains an alumina coating of 14 wt. % of the carrier, platinum concentration of 33 g/l and rhodium concentration of 0.27 g/l.

Figure 3:
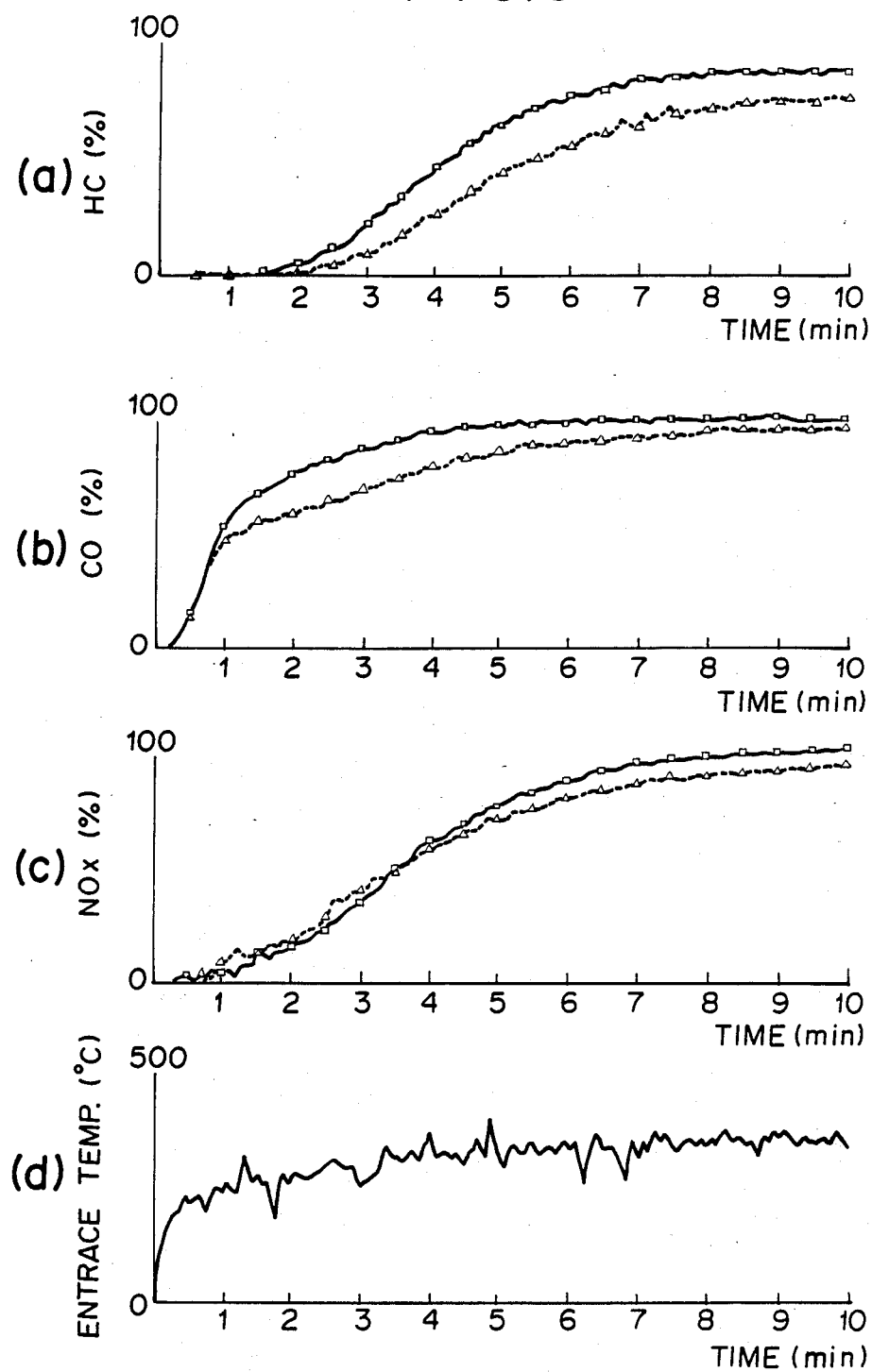
FIG. 3(a) through (c) are graphical representations showing test results.
FIG. 3(d) shows a change in the gas temperature

The test results are shown in FIG. 3(a), 3(b), 3(c) with regard to concentrations of HC, CO, Nox of the sample gases which passed through the catalysts of the present invention and the prior art respectively wherein each of real lines shows a result of the sample gas of the present invention while each of dot lines shows a result of the sample gas of the prior art. FIG. 3(d) shows a change in the gas temperatures detected by the thermometer 15.

It is apparent from the results of the test that the catalyst according to the present invention is advantageous in comparison with the catalyst of the prior art.

EXAMPLE 2

A catalyst was prepared by the same method as example 1. However the catalyst contains a base coat portion of 4 wt. % of the carrier.

EXAMPLE 3

A catalyst was prepared by the same method as example 1. However the catalyst contains a base coat portion of 10 wt. % of the carrier.

EXAMPLE 4

A catalyst was prepared by the same method as example 1. However the catalyst contains a base coat portion of 15 wt. % of the carrier.

With regard to these examples, cleaning efficiency of catalyst and a quantity of peeled off catalyst are examined. The results are shown in FIG. 4.

Figure 4:
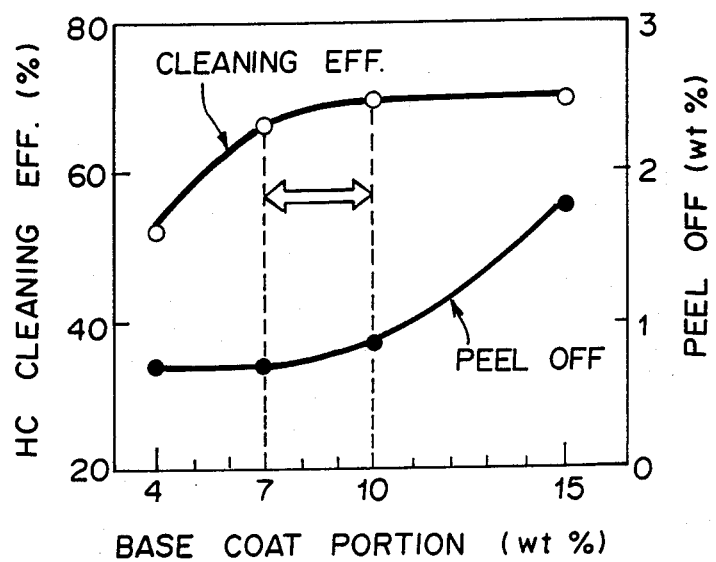
FIG. 4 is a graph showing a relationship between a quantity of a base coat portion of alumina based coating and a quantitY of a peel off catalyst.

It is apparent from FIG. 4 that the rate of the base coat portion is preferably ranged from 7-10 wt. % of the carrier.

Further, examinations are made with regard to a relationship between the quantity of the over coat portion of the alumina based coating and the cleaning efficiency and the peel off quantity of the catalyst.

Figure 5:
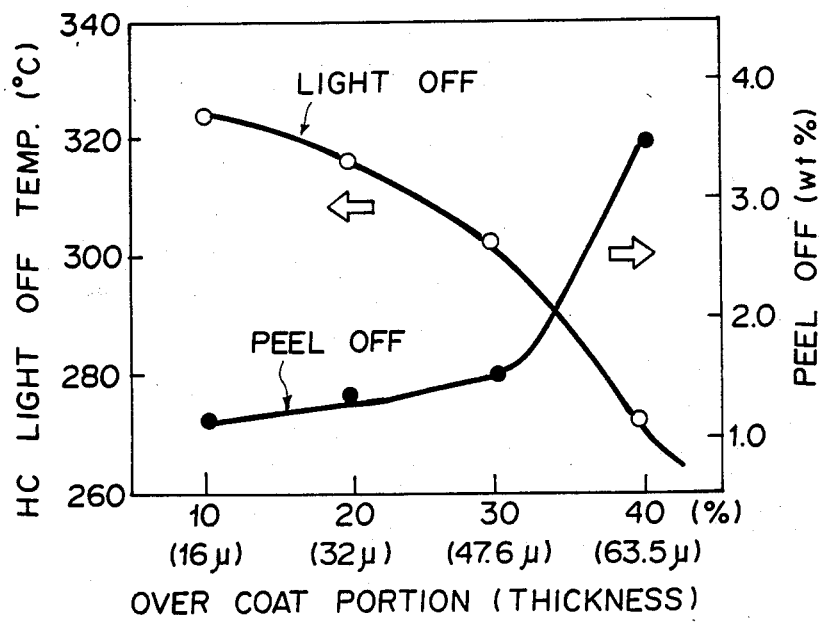
FIG. 5 is a graph showing a relationship between a quantity of an over coat portion of alumina based coating and a quantity of a peel off catalyst.
Figure 6:
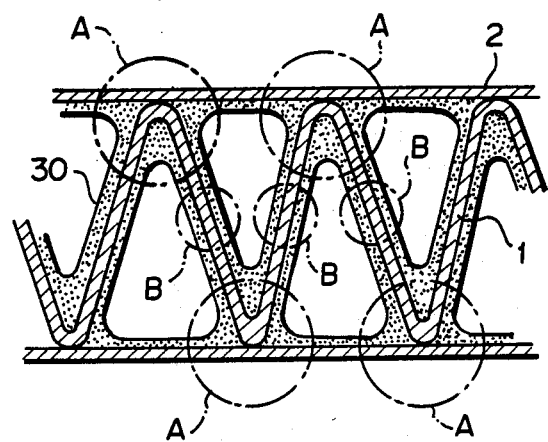
FIG. 6 is an enlarged sectional view of a catalyst of a prior art.

FIG. 5 shows a relationship between a light off or entrance temperature at which the cleaning efficiency reaches 50%, the peel off quantity of the catalyst and the quantity of the over coat portion or the thickness of thereof.

The thicknesses of the over coat portions are illustrated in parenthesis wherein each of the catalysts has the carrier density of 650 g/l and the base coat portion of 10 wt. % of the carrier.

According to the results, the light off temperature is lowered as the thickness of the over coat portion is increased. This means that the cleaning efficiency is improved as the over coat portion is increased. However, when a quantity of the over coat is more than approximately 30 wt. % of the carrier (47.6 micron in thickness) the peel off of the catalyst is significant. Therefore, a quantity of the over coat portion is preferably included in the catalyst less than approximately 30 wt. % of the carrier.

The catalyst may be formed with more than three layers of the alumina based coating.

It will be understood that with regard to the present invention described herein, various changes and modification in amount, and composition may be resorted without departing from the scope of the claimed invention.

We claim:

1. A method of making a catalyst for cleaning exhaust gas from an engine including steps of preparing corrugated metallic panels and plane metallic panels, laminating the plane metallic panels with the corrugated metallic panels alternatively side by side to form a honeycomb structure of a metallic carrier, forming at least two layers of a base coat portion and an over coat portion of alumina based coating on the metallic carrier sequentially, and impregnating catalytic components into at least the outermost layer of the alumina based coating, said metallic carrier being dipped into an alumina slurry including γ-alumina, boehmite, nitric acid and water then dried and calcined to form the base coat portion of the layers of alumina based coating.

2. A method in accordance with claim 1 wherein said the base coat portion of the alumina based coating is 7-10 wt. % of the metallic carrier.

3. A method in accordance with claim 2 wherein $NaBH_4$ is impregnated into the base coat portion.

4. A method in accordance with claim 1 wherein the metallic carrier formed with the base coat portion is dipped into an alumina slurry including γ-alumina, boehmite, $CeO_2$, nitric acid and water then dried and calcined to form said over coat portion of the layers of the alumina based coating.

5. A method in accordance with claim 4 wherein said over coat portion of the alumina based coating is less than 30 wt. % of a sum of the metallic carrier and the base coat portion.

6. A method in accordance with claim 1 wherein after forming said plural layers of the alumina based coating, the metallic carrier is dipped into an aqueous solution including platinum chloride and rhodium chloride to impregnate the catalytic component into the alumina based coating, then dried and calcined.

7. A method in accordance with claim 1 wherein the method includes steps of dipping said metallic carrier into an alumina slurry including γ-alumina, boehmite, nitric acid and water, drying the metallic carrier with an alumina slurry film, calcining the metallic carrier to form the basic coat portion of the layers of alumina based coating, dipping the metallic carrier formed with the basic coat portion into an alumina slurry including γ-alumina, boehmite, $CeO_2$, nitric acid and water, drying the metallic carrier with the base coat portion and an alumina slurry, calcining the metallic carrier to form said over coat portion of the layers of the alumina based coating, dipping the metallic carrier with said plural layers of the alumina based coating into an aqueous solution including platinum chloride and rhodium chloride to impregnate the catalytic component into the alumina based coating, drying and calcining.

8. A catalyst comprising a metallic carrier in which corrugated metallic panels are laminated with plane metallic panels alternatively, a first coat portion of alumina based coating formed on the metallic carrier by dipping the metallic carrier into an alumina slurry, a second coat portion of alumina based coating formed on the first coat portion, and catalytic components impregnated in at least the second coat portion.

9. A catalyst in accordance with claim 8 wherein the catalytic components include platinum and rhodium.

10. A method of making a catalyst for cleaning exhaust gas from an engine including steps of preparing corrugated metallic panels and plane metallic panels, laminating the plane metallic panels with the corrugated metallic panels alternatively side by side to form a honeycomb structure of a metallic carrier, forming at least two layers of a base coat portion and an over coat portion of alumina based coating on the metallic carrier sequentially, and impregnating catalytic components into at least the outermost layer of the alumina based coating, said metallic carrier being dipped into an alumina slurry and then dried and calcined to form the base coat portion of the layers of alumina based coating.

* * * * *